United States Patent [19]
Danek et al.

[11] Patent Number: 5,260,582
[45] Date of Patent: Nov. 9, 1993

[54] CURRENCY VERIFICATION DEVICE FOR DETECTING THE PRESENCE OR THE ABSENCE OF SECURITY THREADS

[76] Inventors: Robert J. Danek, 84 Hendee Rd., Andover, Conn. 06232; Richard A. Menelly, 87 Belden Rd., Burlington, Conn. 06013

[21] Appl. No.: 871,196

[22] Filed: Apr. 20, 1992

[51] Int. Cl.$^5$ .................................................. G06K 5/00
[52] U.S. Cl. ..................................... 250/556; 356/71; 283/85
[58] Field of Search ............... 250/556, 559, 561, 571; 356/71; 209/534; 283/58, 85, 91

[56] References Cited

U.S. PATENT DOCUMENTS

| | | | |
|---|---|---|---|
| 3,980,990 | 9/1976 | Berube | 340/149 |
| 4,524,276 | 6/1985 | Ohtombe | 250/338 |
| 4,652,015 | 3/1987 | Crane | 283/91 |
| 4,761,205 | 8/1988 | Crane | 162/103 |
| 4,879,000 | 11/1989 | Gausa | 250/556 X |
| 4,973,851 | 11/1990 | Lee | 250/556 |
| 4,980,569 | 12/1990 | Crane et al. | 250/556 |
| 5,151,607 | 9/1992 | Crane et al. | 250/556 |

Primary Examiner—David C. Nelms
Assistant Examiner—John R. Lee

[57] ABSTRACT

A linear array of photodiodes and phototransistors is positioned on opposite sides of currency paper subjected to verification for authenticity under transmitted and reflected light. A logic circuit determines the presence or absence of the security feature and correspondingly provides visual or audible indication thereof. The photodiodes, phototransistors and related circuitry are arranged within an enclosure that is located next to a currency-receiving device such as a cash register. Visual or audible indicators are mounted on the device for immediate indication of the currency verification to the cashier. The arrangement of the photodiodes and phototransistors transverse to the major length of the currency paper detects the security feature while confirming that the security feature is within the currency paper and not on either surface.

15 Claims, 5 Drawing Sheets

CURRENCY VERIFICATION DEVICE FOR DETECTING THE PRESENCE OR THE ABSENCE OF SECURITY THREADS

BACKGROUND OF THE INVENTION

The use of a metallized plastic strip embedded within currency paper as a security thread for counterfeit deterrence is described within U.S. Pat. Nos. 4,652,015 and 4,761,205. The security thread is virtually undetected under reflected light and legible under transmitted light to verify its presence.

In commercial situations where verification of currency bills is required, the receiver of the currency bill must subject the currency to a relatively intense light source to read the security thread under transmitted light. With large queues of customers at a bank or supermarket, as well as in places of low level illumination such as bars and restaurants it is difficult to visually inspect the corresponding large number of currency bills. It would be advantageous therefore to have some means of automatically determining the presence of the requisite security thread and confirming authenticity to the teller or cashier.

U.S. Pat. No. 3,980,990 entitled "Ferromagnetic Currency Validator" describes a magnetic detection circuit which first submits a proffered currency paper to a magnetic source to magnetize the ferromagnetic ink used with the signature on the portrait surface of the bill.

U.S. Pat. No. 4,524,276 entitled "Apparatus for Detecting a Security Thread Embedded in a Paper-Like Material" describes an infrared radiation source and two infrared radiation detectors used to determine whether or not a security thread is embedded in the paper-like material and also to determine what the detected security material is made of.

Countries outside of the United States that employ plastic or metal security threads embedded in their paper currency, require that the presence of such security threads be ascertained under transmitted light such as described in the aforementioned U.S. Pat. No. 4,524,276. In accordance with the United States requirement that the currency security thread be detected under transmitted light and not seen under reflected light, both reflective and transmissive determinations must be made for complete verification of the currency.

U.S. Pat. No. 4,980,569 describes a security paper verification device wherein optical means are arranged on opposing surfaces of the currency to determine the absence of any device on the surface of the currency paper while detecting the presence of the device within the currency. This is to prevent attaching counterfeit security threads to the outside surface of the currency paper to replicate genuine currency.

U.S. patent application Ser. No. 694,912 filed May 2, 1991 entitled "Currency Verification Device" describes combination of optical means with inductive or capacitive sensors for verifying the presence of the security thread in currency paper.

U.S. patent application Ser. No. 814,824 filed Dec. 31, 1991 entitled "Security Paper Verification Device" describes optical, magnetic and capacitive sensors used in combination to determine currency authenticity. The dark inks and dyes used in printing U.S. federal reserve notes could provide difficult indication of a metallized security thread when such optical sensors are used, per se.

One purpose of the instant invention is to provide an inexpensive optical verification device that is capable of distinguishing between the dark currency ink and dyes and the metallized security thread in U.S. currency paper.

SUMMARY OF THE INVENTION

Currency verification is made by means of a linear array of photodiodes arranged on one side of paper currency to excite a corresponding linear array of phototransistors arranged on an opposite side thereof to verify the presence of the embedded security thread. The "signature" of currency paper having a security thread is positionally determined transverse to the major length of the currency paper relative to the dark inks and dyes used in printing the currency paper. The photodiodes and phototransistors are then arranged in accordance with the signature pattern. Verification is realized when the phototransistors reproduce the signature in accordance with an associated logic circuit. Indication of PASS or FAILURE is provided by means of red and green photo indicators.

DESCRIPTION OF THE PREFERRED EMBODIMENT

Figure 1:
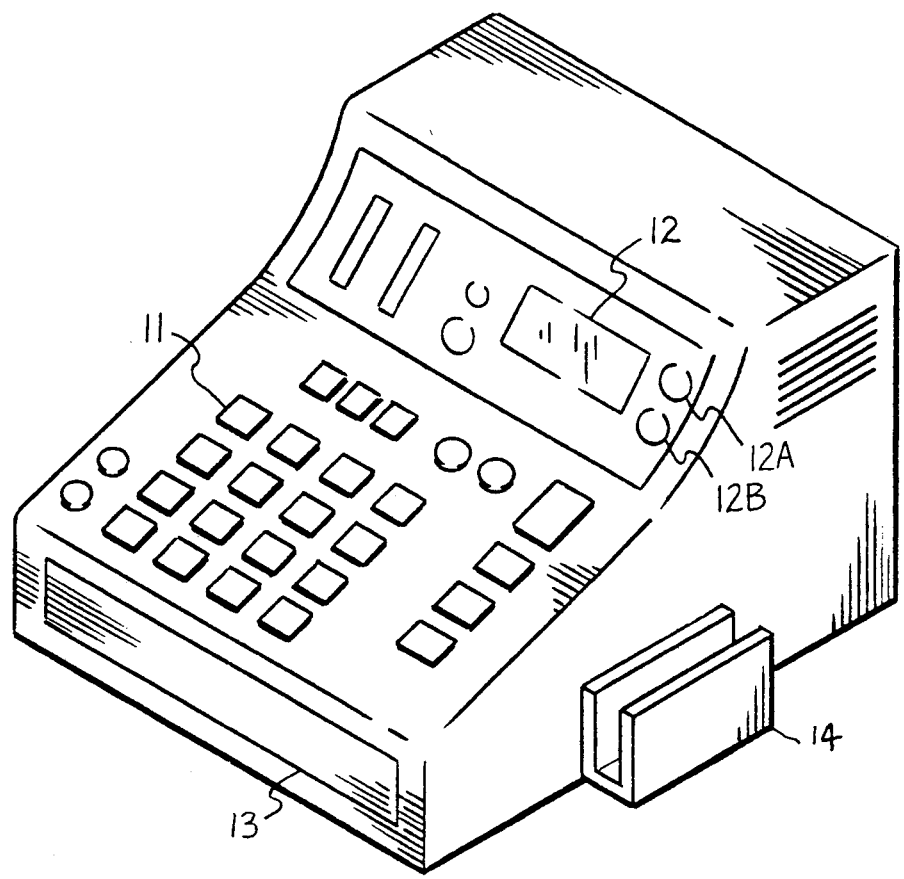
FIG. 1 is a front perspective view of a cash receiver including the verification device according to the invention.

The verification device 14 according to the invention can be used with a cash receiver such as the cash register 10 shown in FIG. 1 with the verification device attached to the cash register next to the cash drawer 13. If desired, the verification device could provide electromagnetic as well as electromechanical interlock with the cash register so that the cash receiver drawer would not open in the event that counterfeit currency is detected within the verification device. The cash register is of the type using a keypad 11 and a display 12 to depict the price of goods being purchased as well as the denomination of the cash proffered by the customer. The same display could automatically register the denomination of the genuine currency within the verification device or, a green light-emitting diode 12A could provide visual indication of genuine currency whereas a red light-emitting diode 12B could indicate the presence of counterfeit currency. The outputs of the verification device could be connected in feedback relation with the cash register control circuit to count the change from the cash drawer to speed up the transaction, if so desired. The currency that failed the currency verification device could be set aside for separate verification by means of an intense light source whereby the operator would examine both surfaces of the currency under reflected light to see whether there is a counterfeit security thread on the surface and then examine the currency under transmitted light to see whether a genuine security thread is embedded within the currency paper.

Figure 2:
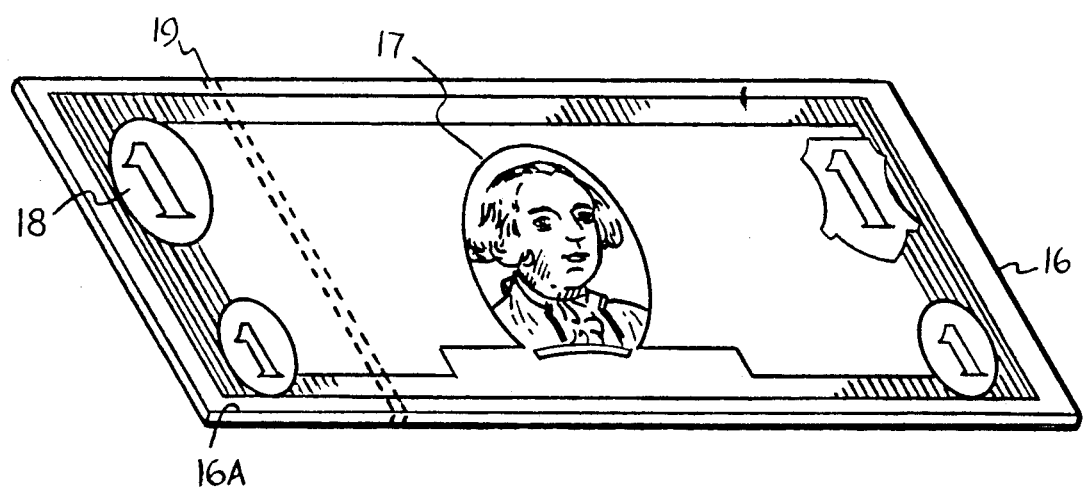
FIG. 2 is a top perspective view of a U.S. currency bill employing a selectively metallized security thread.

FIG. 2 depicts one type of United States currency 15 consisting of a paper bill 16 having the portrait 17 of a United States president or the like and including a security thread 19 embedded therein. The bill is selectively color-printed to enhance the various features printed on both sides of the bill except for a border 16A and currency denomination indicia 18 which retain the basically "white" color of the currency paper prior to printing. It is noted that the security thread extends transversely across the linear extent of the bill from the top to the bottom thereof. The security thread is introduced within the paper in the manner described within the aforementioned U.S. Pat. Nos. 4,652,015 and 4,761,205. The security thread is of the type consisting of a selectively metallized plastic film that is virtually invisible in reflected light and readily apparent under transmitted light. In order to verify the authenticity of such currency, a two-fold test must be performed, whereby the security thread must not be detected upon reflected light and, on the other hand, must be detected under transmitted light.

Figure 3:
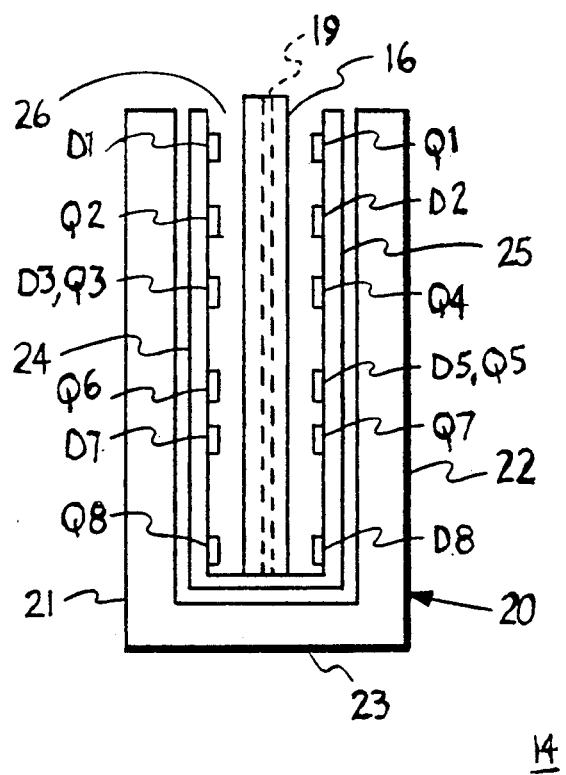
FIG. 3 is an enlarged end view of an edge-testing embodiment of the verification device in accordance with the invention.

A simple verification device 14, shown in FIG. 3, consists of a U-shaped metal or plastic case 20 with two upstanding sidewalls 21, 22 joined by a bottom 23. A pair of printed wire boards 24, 25 joined at the bottom are inserted within the case. Currency verification is achieved by inserting the currency paper 16 within the slot 26 formed within the printed wire boards between the two sidewalls such that the currency stops against the bottom of the printed wire boards. This, in turn, assures that at least part of the security thread 19 will lie between the optically active parts of the printed wire boards. A "signature" is determined for the currency by determining the location of the inks and dyes along the extent of the security thread 19, as viewed in FIG. 2, and then arranging a series of light-emitting diodes and phototransistors on both sides of the currency paper co-extensive with the security thread. In the verifier device 14 of FIG. 3, light-emitting diode (LED) $D_1$, phototransistor (PT) $Q_2$, LED $D_3$, PT $Q_3$, PT $Q_6$, LED $D_7$ and PT $Q_8$ are arranged on one side of the currency paper 16 on one printed wire board 24 while PT $Q_1$, LED $D_2$, PT $Q_4$, LED $D_5$, PT $Q_5$, PT $Q_7$, and LED $D_8$ are arranged on the printed wire board 25 on the opposite side thereof. The presence or absence of print and dye for each specific location of the LEDs and PTs is determined to provide the signature and a Truth Table is developed for the specific arrangement thereof.

Figure 4:
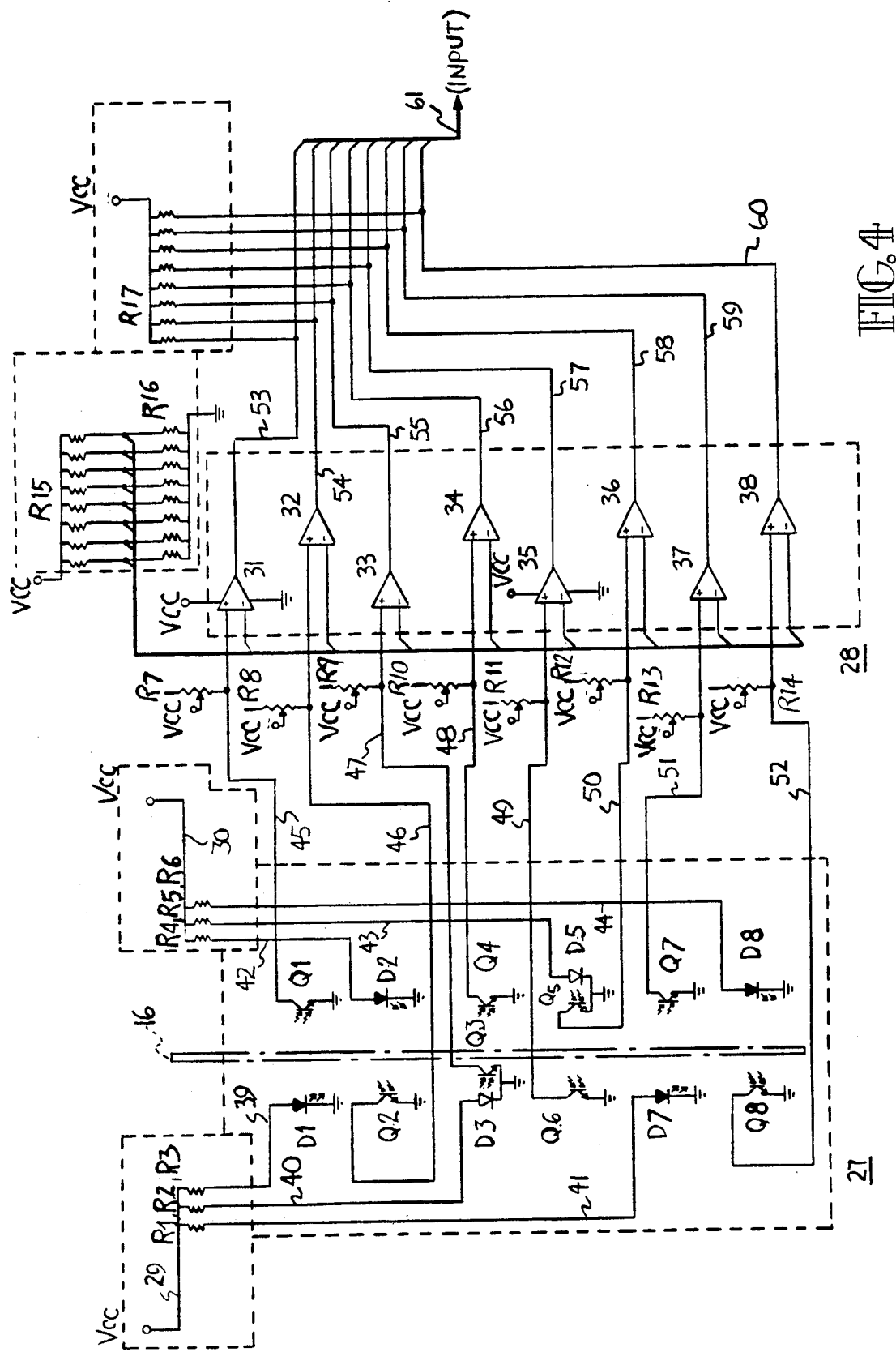
FIG. 4 is a schematic representation of the components within the optics and logic circuits contained within the verification device of FIG. 2.

In the arrangement depicted in FIG. 4, PTs $Q_3$, $Q_4$ respond to common LED $D_3$ and PTs $Q_5$, $Q_6$ correspond to common LED $D_5$. LED $D_3$, for example, is arranged on one side of the currency paper 16 at a location corresponding to the "white" currency paper background and LED $D_5$ is arranged on an opposite side at a location corresponding to the presence of either the black print or green dye. "Reflective" PT $Q_3$ is arranged on the same side of the currency paper as LED $D_3$ and is calibrated to produce a logic "0" when light is reflected from the "white" surface of the currency paper in the absence of a counterfeit security thread on the surface and "reflective" PT $Q_5$ is calibrated to produce a logic "1" when no light is reflected in the absence of a security thread on the currency surface. A logic "1" output from "transmissive" PTs $Q_4$, $Q_6$, indicates the presence of the security thread within the currency paper. A reflective PT-LED combination is a type SFH 900 photo-reflector obtained from Siemens ACG Company. The presence of the security thread is further indicated by the additional transmissive PTs $Q_1$, $Q_2$, $Q_7$, and $Q_8$ that are alternately arranged on opposite sides of the currency paper to detect the absence of transmitted light from their associated LEDs $D_1$, $D_2$, $D_3$, $D_7$ and $D_8$. The additional LEDs and PTs insure that the security thread is continuous along the entire width of the currency paper. One example of an LED used for $D_1$, $D_2$, $D_7$ and $D_8$ is an LED 71 obtained from Motorola Co., and one example of a PT used for $Q_1$, $Q_2$, $Q_4$, $Q_6$, $Q_7$ and $Q_8$ is an MRD 711 also obtained from Motorola Company.

Additional reflective-transmissive PT pairs from a common LED could be positioned along opposite sides of the currency paper for redundant indication of the absence of a security thread on the surface of the currency paper, if so desired or to use the signature of the currency paper to provide indication of the currency denomination since the security thread is located at different positions within the currency for the different currency denominations.

Bias for the $D_1$, $D_3$ and $D_7$ within the optics circuit 27 is provided from the voltage source through conductors 29, 39, 40, 41 and bias resistors $R_1$–$R_3$. Bias for the $D_2$, $D_5$ and $D_8$ is provided by means of conductors 30, 42, 43 and 44. The collector of $Q_1$ is connected by conductor 45 to one input to a comparator 31 within the associated logic circuit 28 for comparison to the other input to which reference voltage is provided by one of the resistors within the resistor arrays $R_{15}$, $R_{16}$.

The logic 1 and logic 0 threshold output on PT $Q_1$ is set by variable resistor $R_7$. The threshold at the input to comparator 31 is such that when the security thread is present, $Q_1$ turns off, $R_7$ sets a logic 1 at the output of the comparator 31 and pulls up the voltage on conductor 45. A logic 1 output from comparator 31 occurs when the voltage on conductor 45 is greater than the voltage set by the voltage divider consisting of resistors $R_{15}$ and $R_{17}$. Correspondingly, a logic 0 is output from comparator 31 when the voltage on conductor 45 is less than the voltage established by the voltage divider network $R_{15}$, $R_{17}$ and PT $Q_1$ is on. The Truth Table for the comparators within the logic circuit is given below. One example of a comparator used for the comparators 31–38 is a type LM339N obtained from Texas Instruments Company.

TRUTH TABLE

| Comparator | Input | Output |
|---|---|---|
| 31 | 1 | 1 |
| 32 | 1 | 1 |
| 33 | 1 | 1 |
| 34 | 1 | 1 |
| 35 | 1 | 1 |
| 36 | 0 | 1 |
| 37 | 1 | 1 |
| 38 | 1 | 1 |

The light received by $Q_1$ gates the collector to ground reflecting a zero output voltage, i.e. logic "0" over conductor 53 which connects with the output of comparator 31. This logic 0 is an indication that the security thread is absent from the currency paper at this specific location. Light received by $Q_2$ similarly gates the collector to ground with a zero voltage appearing at the input of comparator 32 over conductor 46 producing a logic 0 output on conductor 54. This is a second indication that the security thread is absent from the currency paper. This is the same for $Q_4$, $Q_6$, $Q_7$ and $Q_8$ wherein the absence of a voltage over the associated conductors 48, 49, 51, 52 produces a logic 0 on the outputs of comparators 34, 35, 37, 38 and conductors 56, 57, 59, 60. In a similar manner, the absence of light on $Q_1$, $Q_2$, $Q_4$, $Q_6$, $Q_7$, $Q_8$ results in a logic "1" appearing on the outputs of their associated comparators and conductors to provide indication that the security thread is present within the currency paper. $D_5$ in combination with $Q_5$, $Q_6$ operate in a similar manner to that described with reference to $D_3$ and associated PTs $Q_3$, $Q_4$ to determine whether the security thread is within the paper or on the surface by providing corresponding indication over conductors 49, 50, and associated comparators 35, 36 and conductors 57, 58. The comparators 31-38 are calibrated by means of the bias resistors $R_7$-$R_{14}$ and output pull-up bias is provided to the conductors 53-60 by means of the resistor array $R_{17}$. It is noted that all the transmissive PTs are collector-to-ground connected resulting in a zero output voltage when the PTs receive light for indication that the security thread is absent. The arrangement of the "reflective" PTs $Q_3$, $Q_5$ provides a zero output indication when light is reflected off the surface of the currency paper to provide indication of the absence of a counterfeit security thread on the surface of the currency paper and that the security paper is genuine. It is noted that the number of transmissive and reflective PTs can be increased for redundantly detecting whether the security thread is within the currency paper or on the surface thereof. The output data on conductors 53-60 is conducted by a multi-cable conductor 61 to the input ports of a microprocessor 63 such as a Signetics type 8031 microprocessor, depicted within the control circuit 62 of FIG. 5. Any alignment tolerances of the security thread relative to the LEDs $D_1$-$D_8$ and PTs $Q_1$-$Q_8$ of FIG. 4 is compensated by instructions to the microprocessor that the absence of light to any three of the transmissive PTs $Q_1$, $Q_2$, $Q_4$, $Q_6$, $Q_7$, $Q_8$ is a sufficient indication that the security thread is present within the currency paper. An alternative method to indicate the logic depicted in the Truth Table could readily be implemented using common logic gates to perform the required "ANDING" and "ORING" to establish a Pass/Fail condition. Another method could include the use of a common programmable logic device to implement the required and/or logic. One example being a type EP610 obtained from the Altera Company.

The output data from the multi-conductor cable 61 is coupled with the input ports on the microprocessor via conductors 53-60 to determine whether to output a "pass" signal over conductor 69 and bias resistor $R_{18}$ to the green LED 12A or to output a "fail" signal over conductor 70 and bias resistor $R_{19}$ to the red LED 12B. The data from the Truth Table is stored in a look-up table within ROM 65 which connects with the microprocessor by means of the address bus 67 and the control bus 68. The ROM provides such information to the microprocessor over the data bus 71. The Pass/Fail output from the microprocessor is manually cleared by means of an external switch 65 which connects between the microprocessor and electrical ground by means of conductor 64. Alternately, an electromechanical or optical switch could be located in the currency receiver such that the Pass/Fail indication is automatically cleared when currency paper is inserted.

Figure 5:
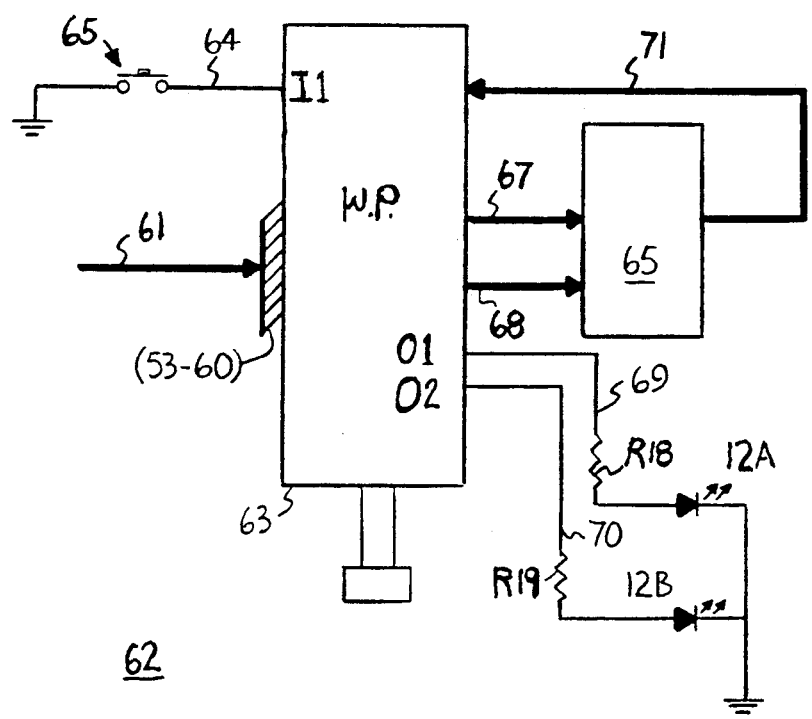
FIG. 5 is a schematic representation of the components contained within the output circuit within the verification device of FIG. 2.
Figure 6:
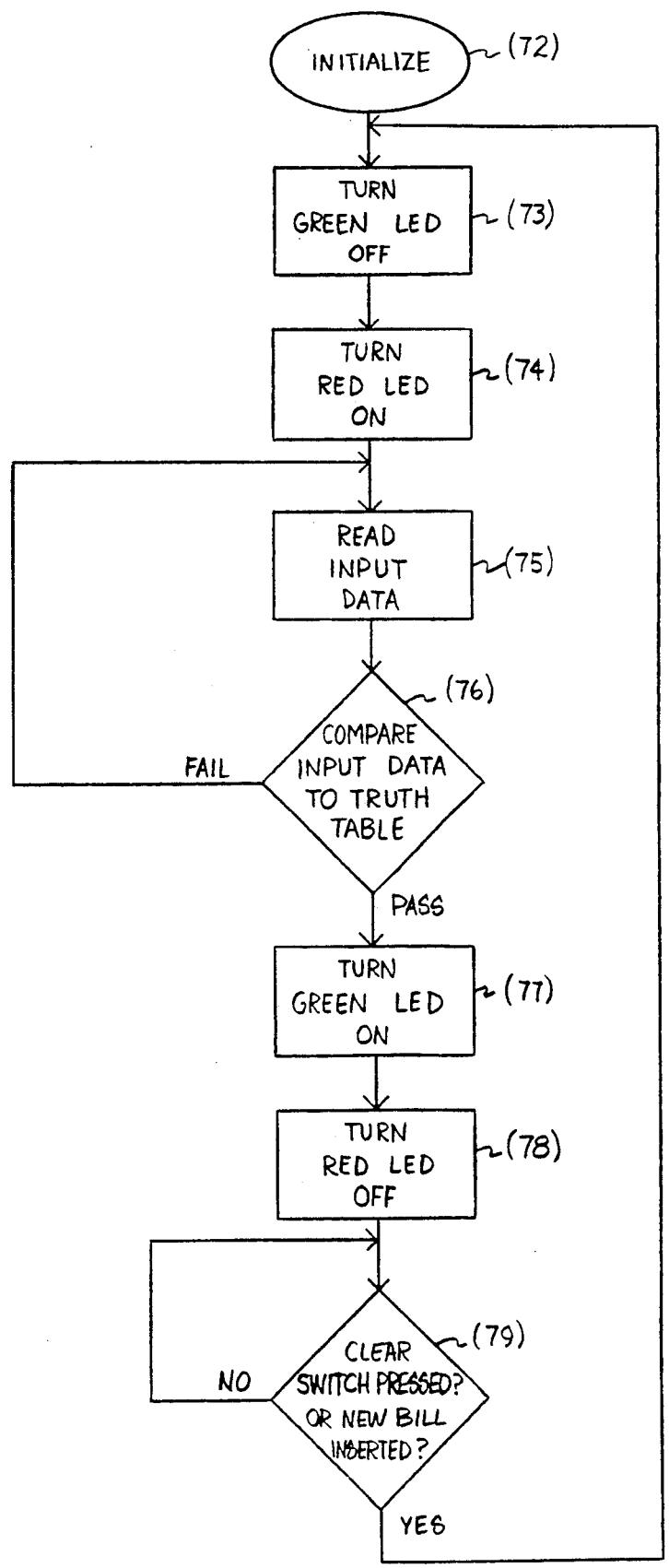
FIG. 6 is a flow chart representation of the instructions to the microprocessor contained within the control circuit of FIG. 5.

The operation of the control circuit 62 is best seen by referring both to the flow diagram depicted in FIG. 6 and the control circuit 62 depicted in FIG. 5. When the microprocessor is initialized (72) the green LED 12A is turned OFF (73) and the red LED 12B is turned ON (74). The input data is read (75) and compared (76) to the data stored in the ROM 65. If the Truth Table is satisfied, the red LED is turned OFF (78), and the green LED is turned ON (77). A determination request is made as to whether the clear switch is pressed or a new bill is inserted (79) and if so, the loop (73)-(79) is repeated. If not, the determination request (79) is continuously repeated. If the Truth Table is not satisfied, the red LED is kept on.

A reliable method of currency verification along with inexpensive circuits for performing such verification have herein been described. The verification can be combined with a commercial cash receiver for change making function as well as within banking establishments for currency verification, counting and sorting in combination with automatic currency handling equipment.

The currency verification circuit could be used with alternate security features such as a watermark with appropriate instructions to the microprocessor and/or signature determination by arrangement of the PTs and LEDs.

Having thus described our invention, what we claim as new and desire to secure by Letters Patent is:

1. Apparatus for detecting the presence or absence of security threads in paper comprising:
   verifier means adapted for receiving a rectangular paper containing a security thread, said paper defining a predetermined length and a predetermined width transverse to said length;
   a plurality of first light emitters within said means arranged in a first array corresponding to a reflective and transmissive pattern determined along said width on one side said paper;
   a corresponding plurality of first light detectors arranged corresponding to said first array along said width on an opposite side of said paper; and
   logic circuit means connecting with said first detectors providing indication whether said reflective and transmissive pattern is present or absent.

2. The apparatus of claim 1 including a second light detector arranged on said one side receiving reflective light from one of said first light emitters.

3. The apparatus of claim 1 including a second light emitter arranged on said opposite side providing reflective light to one of said first detectors.

4. The apparatus of claim 1 wherein said logic circuit includes a plurality of comparators arranged for detecting said reflective and transmissive pattern and for providing indication when said pattern is present or absent.

5. The apparatus of claim 1 including processor means connecting with said logic circuit providing confirmation that said reflective and transmissive pattern is present or absent.

6. The apparatus of claim 4 wherein said comparators include a pair of input with said detectors and a reference value said comparator providing a first logic state when said reflective and transmissive pattern is present and a second logic state when said reflective and transmissive pattern is absent.

7. The apparatus of claim 5 wherein said processor means comprises a microprocessor.

8. The apparatus of claim 7 including a ROM connecting with said microprocessor, said ROM containing said first and second logic states.

9. The apparatus of claim 8 wherein said ROM further includes a look-up table indicative of said reflective and transmissive pattern.

10. A method for detecting the presence of a security feature in currency paper comprising the steps of:
   providing a rectangular currency paper of a first denomination containing a security feature;
   determining a first pattern along one side of said paper, said first pattern comprising the presence or absence of inks, dyes and a security feature;
   arranging a plurality of first photodetectors and photoemitters on said one side of said paper corresponding to said first pattern; and
   providing logic circuit means connecting with said photodetectors to detect whether said first pattern is present or absent from said one side of said paper.

11. The method of claim 10 including the steps of:
   determining a second pattern on another side of said paper said second pattern comprising the presence or absence of inks, dyes and a security thread on said other side; and
   arranging a plurality of second photodetectors and photoemitters on said other side corresponding to said second pattern.

12. The method of claim 10 including the step of storing said first and second patterns in a ROM.

13. The method of claim 12 including the step of controlling said ROM from a microprocessor.

14. The method of claim 10 including the steps of:
   determining a third pattern on said one side of said paper, said third pattern comprising the presence or absence of inks, dyes and an embedded security thread, said third pattern indicative of said currency denomination.

15. The method of claim 10 wherein said security feature comprises a security thread or watermark.

* * * * *